(12) United States Patent
Suzuki

(10) Patent No.: US 6,883,419 B2
(45) Date of Patent: Apr. 26, 2005

(54) FRYER

(75) Inventor: Akira Suzuki, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 0 days.

(21) Appl. No.: 10/641,274

(22) Filed: Aug. 14, 2003

(65) Prior Publication Data

US 2004/0035298 A1 Feb. 26, 2004

(30) Foreign Application Priority Data

Aug. 26, 2002 (JP) ........................................ 2002-245406

(51) Int. Cl.⁷ .............................................. A47J 37/12
(52) U.S. Cl. .............................. 99/330; 99/331; 99/332; 99/342; 99/403; 126/374.1; 126/391.1
(58) Field of Search ......................... 99/325–334, 337, 99/338, 342, 403–410; 126/391.1, 389.1, 390.1, 378.1, 374.1, 369; 210/167, DIG. 8; 219/492, 494, 497, 506, 508, 442, 486, 510, 512; 426/231–233, 438, 519, 523; 431/326.1, 170; 700/90, 99, 85, 300; 340/589

(56) References Cited

U.S. PATENT DOCUMENTS

| | | | | |
|---|---|---|---|---|
| 4,465,228 A | | 8/1984 | Mori et al. | |
| 4,599,990 A | * | 7/1986 | Fritzsche et al. | ......... 126/374.1 |
| 4,601,004 A | | 7/1986 | Holt et al. | |
| 4,623,544 A | * | 11/1986 | Highnote | .................... 426/233 |
| 4,625,086 A | | 11/1986 | Karino | |
| 4,663,710 A | | 5/1987 | Waugh et al. | |
| 4,672,540 A | | 6/1987 | Waugh et al. | |
| 4,812,625 A | | 3/1989 | Ceste, Sr. | |
| 4,858,119 A | | 8/1989 | Waugh et al. | |
| 4,913,038 A | | 4/1990 | Burkett et al. | |
| 4,928,664 A | * | 5/1990 | Nishino et al. | ........... 126/391.1 |
| 4,945,893 A | * | 8/1990 | Manchester | ............... 126/391.1 |
| 4,947,824 A | * | 8/1990 | Ejiri et al. | ................ 126/391.1 |
| 5,186,097 A | | 2/1993 | Vaseloff et al. | |
| 5,240,725 A | | 8/1993 | Akamatsu et al. | |
| 5,261,322 A | * | 11/1993 | Yokoyama et al. | ........... 99/330 |
| 5,297,474 A | * | 3/1994 | Tabuchi | ........................ 99/344 |
| 5,575,194 A | | 11/1996 | Maher, Jr. et al. | |
| 5,596,514 A | | 1/1997 | Maher, Jr. et al. | |
| 5,819,638 A | * | 10/1998 | Yokoyama | .................... 99/330 |
| 5,827,556 A | | 10/1998 | Maher, Jr. | |
| 6,018,150 A | | 1/2000 | Maher, Jr. | |
| 6,131,564 A | * | 10/2000 | Song | ........................ 126/391.1 |
| 6,138,552 A | | 10/2000 | Baillieul et al. | |
| 6,269,808 B1 | * | 8/2001 | Murahashi | ................ 126/391.1 |
| 6,345,571 B2 | * | 2/2002 | Tateyama | ..................... 99/330 |
| 6,354,192 B2 | * | 3/2002 | Tateyama | ..................... 99/330 |
| 6,443,051 B1 | * | 9/2002 | Suzuki | ......................... 99/330 |

FOREIGN PATENT DOCUMENTS

EP             1 028 289         8/2000

* cited by examiner

Primary Examiner—Timothy F. Simone
(74) Attorney, Agent, or Firm—Burr & Brown

(57) ABSTRACT

A fryer in which an overshoot is prevented by an accurate oil temperature control is disclosed. A pulse burner (4) is controlled to be switched ON/OFF based on a condition which is different by each temperature range. This enables to control the pulse burner (4) in accordance with factors which effect on the oil temperature such as an amount and heat capacity of foods and heat quantity of a utensil. Whereby, the oil temperature control in an excellent level is performed under various conditions. Moreover, as the condition to perform ON/OFF control of the pulse burner (4) is simple, for example, which is whether or not the temperature gradient of cooking oil exceeds the standard value, it needs no complicated control and reliability is improved.

17 Claims, 11 Drawing Sheets

Set temperature at 340° F

| Temperature range condition | Mark | Combustion condition | Purpose |
|---|---|---|---|
| 339° F or more | D | Combustion OFF (all time) | |
| less than 339° F<br>338° F or more | A | Temperature gradient≥0° F/5s:Combustion OFF<br>Temperature gradient<0° F/5s:Combustion ON | Mainly temperature control with no food |
| less than 338° F<br>335° F or more | B | Temperature gradient≥0.2° F/5s:Combustion OFF<br>Temperature gradient<0.2° F/5s:Combustion ON | Mainly temperature control during cooking |
| Less than 335° F | C | Combustion ON (all time) | Continuous combustion until the oil temperature becomes 335° F when a great amount of foods are put |

FIG. 1

Set temperature at 340° F

| Temperature range condition | Mark | Combustion condition | Purpose |
|---|---|---|---|
| 339° F or more | D | Combustion OFF (all time) | |
| less than 339° F 338° F or more | A | Temperature gradient≥0° F/5s:Combustion OFF<br>Temperature gradient<0° F/5s:Combustion ON | Mainly temperature control with no food |
| less than 338° F 335° F or more | B | Temperature gradient≥0.2° F/5s:Combustion OFF<br>Temperature gradient<0.2° F/5s:Combustion ON | Mainly temperature control during cooking |
| Less than 335° F | C | Combustion ON (all time) | Continuous combustion until the oil temperature becomes 335° F when a great amount of foods are put |

FIG. 9

Set temperature at 340° F

| Temperature range condition | Continued combustion | Combustion is stopped |
|---|---|---|
| 335° F or more | Combustion OFF (all time) | After 60s, it goes to normal temperature control |
| Less than 334° F 330° F or more | 0.2° F/5s ≤ temperature gradient < 0.9° F/5s: Combustion OFF | In the event that temperature gradient < 0° F/5s, it immediately goes to normal temperature control |
| Less than 330° F 327° F or more | Temperature gradient ≥ 0.9° F/5s: Combustion OFF | ↓ |
| Less than 327° F | Combustion ON (all time) | |

FIG. 11

Set temperature at 340° F

| Temperature range condition | Mark | Combustion is stopped | Continued combustion |
|---|---|---|---|
| 339° F or more | D | Combustion OFF (all time) | ← |
| Less than 339° F 338° F or more | A | Temperature gradient≥0° F/5s:Combustion OFF<br>Temperature gradient<0° F/5s:Combustion ON<br>No combustion within 50s after the last stop of combustion | Combustion stops after 12s' continuous combustion<br>Combustion stops after 10s' combustion if it is ignited within 100s after the last combustion stop |
| Less than 338° F 335° F or more | B | Temperature gradient≥0.2° F/5s:Combustion OFF<br>Temperature gradient<0.2° F/5s:Combustion ON | ← |
| Less than 335° F | C | Combustion ON (all time) | ← |

FIG. 12

Set temperature at 340° F

| Temperature range condition | Mark | Combustion is stopped | Continued combustion |
|---|---|---|---|
| 339° F or more | D | Combustion OFF (all time) | ← |
| Less than 339° F 338° F or more | A | Temperature gradient≥0° F/5s:Combustion OFF<br>Temperature gradient<0° F/5s: Combustion ON of one of two burners<br>No combustion within 50s after the last stop of combustion | Combustion stops after 12s' continuous combustion<br>Combustion stops after 10s' combustion if it is ignited within 100s after the last combustion stop |
| Less than 338° F 335° F or more | B | Temperature gradient≥0.2° F/5s:Combustion OFF<br>−0.3° F/5s≤temperature gradient<0.2° F/5s: Combustion ON of one of two burners<br>Temperature gradient <−0.3° F/5s: Combustion ON of two burners | ← |
| Less than 335° F | C | Combustion ON (all time) | ← |

FIG. 13

Set temperature at 340° F

| Temperature range condition | Mark | Combustion is stopped | Continued combustion |
|---|---|---|---|
| 339° F or more | D | Combustion OFF (all time) | ↓ |
| | | No combustion within 50s after the last stop of combustion | Continuous combustion for at least 5s after combustion start |
| Less than 339° F | A | Temperature gradient≥0° F/5s:Combustion OFF | Combustion stops after 12s' continuous combustion |
| 338° F or more | | Temperature gradient<0° F/5s: Combustion ON of one of two burners | Combustion stops after 10s' combustion if it is ignited within 100s |
| | | No combustion within 50s after the last stop of combustion | Continuous combustion for at least 10s after ignition |
| Less than 338° F | B | Temperature gradient≥0.2° F/5s:Combustion OFF | ↓ |
| 335° F or more | | −0.3° F/5s≤temperature gradient<0.2° F/5s: Combustion ON of one of two burners | No combustion for 50s if oil temperature≥337° F and temperature gradient≥0° F/5s |
| | | Temperature gradient <−0.3° F/5s: Combustion ON of two burners | Continuous combustion for at least 10s after ignition |
| Less than 335° F | C | Combustion ON (all time) | ↓ |

FRYER

BACKGROUND OF THE INVENTION

This application claims the benefit of Japanese Application No. 2002-245406 filed Aug. 26, 2002, the entirety of which is incorporated by reference.

1. Field of the Invention

The present invention relates to a fryer for controlling an ON/OFF operation of a heating means based on a temperature detected by a temperature sensor so that the temperature of cooking oil is maintained at a set temperature.

2. Related Art Statement

Conventionally, cooking utensils such as fryers used for frying foods in fast food restaurants etc., detect the temperature of cooking oil and control the combustion of a burner to maintain the oil temperature within a predetermined range. This temperature control has been normally conducted by a control of an ON/OFF operation of the burner. For example, the burner starts combustion when the detected oil temperature is below a predetermined range, while the burner stops when the oil temperature exceeds the predetermined range. Thus, combustion is controlled in order to maintain the oil temperature within the predetermined range.

However, there may be various factors effecting a change of the oil temperature, such as an amount or heat capacity of foods and heat quantity of a utensil etc. Therefore, when combustion is carried out based on a fixed temperature, the oil temperature often rises excessively high (namely, an overshoot). To prevent this overshoot, it is necessary to stop the combustion in an appropriate timing before the oil temperature reaches a set temperature. In this procedure, when combustion is stopped too early, it is necessary to ignite the burner frequently, resulting the difficulty in durability of the fryer and accuracy of control of the oil temperature.

Moreover, there would be a gap in an oil temperature change between around the foods and around the temperature sensor due to a lack of the oil temperature distribution and an oil circulation. Accordingly, although the oil temperature around the foods is suitable to stop the combustion, the oil temperature detected by the temperature sensor does not rise enough and the combustion stop timing is badly delayed, which causes an overshoot.

In order to solve the above problems, an object of the present invention is to provide a fryer which prevents an overshoot by controlling the oil temperature accurately.

SUMMARY OF THE INVENTION

To achieve the above-mentioned object, according to a first aspect of the present invention, a fryer is provided comprising an oil vat for containing cooking oil; heating means for heating the cooking oil; heating control means for maintaining a temperature of the cooking oil at a set temperature by controlling the heating means; and a temperature sensor for detecting the temperature of the cooking oil. The heating means is turned ON and OFF to maintain the oil temperature at the set temperature based on the detected temperature by the temperature sensor, wherein each heating control condition, which is different depending on preset temperature ranges is stored and the heating means is turned ON and OFF according to the heating control condition corresponding to the temperature ranges to which the detected temperature by the temperature sensor belongs.

According to a second aspect of the present invention, there is provided a fryer according to the first aspect, further comprising a temperature gradient detecting means for detecting a gradient of the detected temperature with respect to elapsed time, wherein the preset temperature ranges include a temperature range where the heating means is switched ON and OFF according to the temperature gradient.

According to a third aspect of the present invention, there is provided a fryer according to the first aspect, further comprising a temperature gradient detecting means for detecting a gradient of the detected temperature with respect to elapsed time, wherein the preset temperature ranges include three ranges: a temperature range where the heating means is always turned ON, a temperature range where the heating means is switched ON/OFF according to the gradient, and a temperature range where the heating means is always turned OFF.

According to a fourth aspect of the present invention, there is provided a fryer according to the second and third aspects, wherein the temperature range where the heating means is switched ON/OFF according to the gradient is subdivided into at least two temperature ranges, and each of the ranges has a different standard value of temperature gradient as a criterion to switch ON/OFF the heating means.

According to a fifth aspect of the present invention, there is provided a fryer according to any of the first through fourth aspects, wherein once the heating means is turned ON, the heating means is controlled to continue ON operation for at least a preset minimum ON time in each of the temperature ranges.

According to a sixth aspect of the present invention, there is provided a fryer according to the first aspect, wherein, when the heating means once turned ON by the heating control condition, regardless of the detected temperature, the heating means maintains ON operation for a preset ON time and then maintains OFF operation for a preset OFF time in the temperature range which is the closest to the most desirable temperature range including the set temperature.

According to a seventh aspect of the present invention, there is provided a fryer according to the sixth aspect, wherein the preset ON time is set shorter than the preset OFF time.

According to an eighth aspect of the present invention, there is provided a fryer according to the sixth or seventh aspects, wherein under the condition that the heating means is turned ON within a preset interval from termination of the OFF time, the ON time is shortened.

According to a ninth aspect of the present invention, there is provided a fryer according to any of the above aspects, wherein the heating means is turned ON/OFF according to second heating control conditions stored for each temperature range which is different from the temperature range when the detected temperature is below a predetermined value at the time of initial operation.

According to a tenth aspect of the present invention, there is provided a fryer according to the second aspect, wherein the heating means is consisted of a plurality of heating devices which are controlled to be switched ON and OFF individually and further comprising a switching means for switching the number of the heating devices working based on the detected temperature gradient.

According to an eleventh aspect of the present invention, there is provided a fryer according to the tenth aspect, wherein further comprising an equalization control means for controlling the operation of the heating devices so that each of the heating devices works equalized number of times.

According to a twelfth aspect of the present invention, there is provided a fryer according to the first aspect, wherein various set values are stored in a nonvolatile memory which is writable and interchangeable.

In the fryer according to the first aspect of the present invention with the above configuration, the heating means is controlled to be turned ON and OFF, and foods are cooked by being put into the cooking oil maintained within a set temperature. In this procedure, ON/OFF control of the heating means is performed based on the heating control conditions which vary depending on the preset temperature ranges. For example, in a temperature range which is far below the set temperature, the heating control condition that the heating means is easily operated is set so that the oil temperature reaches the setting level rapidly. On the other hand, in a temperature range which is slightly below the set temperature, the heating control condition that the heating means is not easily operated is set so that an overshoot can be prevented.

In the fryer according to the second aspect of the present invention, the preset temperature ranges include temperature ranges with the heating control condition that the heating means is switched ON/OFF according to the temperature gradient, whereby a temperature control is carried out accurately. For example, when the oil temperature rises rapidly, namely, the temperature gradient is large, heating is cancelled by turning the heating means OFF early, thereby an overshoot is prevented.

In the fryer according to the third aspect of the present invention, the preset temperature ranges include three ranges: a temperature range in which a heating control condition where the heating means is always turned ON is set, a temperature range in which a heating control condition where the heating means is switched ON/OFF according to the temperature gradient is set, and a temperature range in which a heating control condition where the heating means is always turned OFF is set, which enables an accurate temperature control. For example, the heating means is always turned ON in a temperature range which is far below the set temperature. On the other hand, the heating means is always turned OFF in a temperature range which is over the most desirable temperature range including the set temperature. Further, if the oil temperature belongs to temperature range which is between the above two ranges, the heating means is switched ON/OFF according to the temperature gradient. In this temperature range, when the oil temperature rises rapidly, which means the temperature gradient is large, the heating means is switched OFF to stop heating early, thereby an overshoot is prevented.

In the fryer according to the fourth aspect of the present invention, the temperature range where the heating means is switched ON/OFF according to the temperature gradient is subdivided into a plurality of temperature ranges, and each of the ranges has a different standard value of temperature gradient, which enables a more accurate temperature control.

For example, the temperature range where the heating means is switched ON/OFF according to the temperature gradient is subdivided into two temperature ranges. In a temperature range which is slightly below the set temperature with no foods in the oil vessel, a small temperature gradient as a standard value is set to provide the condition that the heating means is difficult to be operated, thereby preventing an overshoot. On the other hand, in a temperature range which is far below the set temperature by putting foods into the oil vessel, a large temperature gradient as a standard value is set to provide the condition that the heating means is easily operated, which enables to reach the set temperature rapidly.

In the fryer according to the fifth aspect of the present invention, once the heating means is turned ON, the heating means continues ON operation for at least a preset minimum ON time. Whereby, a frequent ON/OFF switching of the heating means is prevented.

In the event that there are no foods in the oil vessel, oil circulation by the foods does not occur. Moreover, oil circulation by heating rarely occurs because only small heat quantity and short heating time is needed. In this case, it is difficult to control the oil temperature in an excellent level due to the delay of response of oil temperature change around the temperature sensor with respect to oil temperature change around the cooking portion where foods are put.

In order to solve the above problem, in the fryer according to the sixth aspect of the present invention, the heating means is operated for a preset ON time in order to heat the oil, and then it is switched OFF and continues the state for a preset OFF time in the temperature range which is the closest to the most desirable temperature range for cooking including the set temperature. In other words, in the temperature range which is slightly below the set temperature without putting foods into the oil vessel, the necessary heat quantity to obtain the oil temperature at a certain level is fixed. Accordingly, regardless of the temperature gradient, the heating means operates for the preset ON time to obtain necessary heat quantity to be expected to maintain the set temperature. Thus, when there is a gap in an oil temperature between the temperature sensor and cooking portion due to shortage of oil circulation around the temperature sensor, an accurate temperature control can be maintained.

In the fryer according to the seventh aspect of the present invention, in a temperature range which is the closest to the most desirable temperature range including the set temperature, the oil temperature easily reaches the set temperature with small heat quantity. Therefore, OFF time of the heating means is set to be longer than ON time, so that an overshoot is prevented without fail.

In addition, when cooking has just finished, there is a gap in oil temperature among several portions of the oil vessel. Then, while the oil circulates and becomes an equalized temperature, a minus temperature gradient may be detected although heat quantity is not reduced largely. As a result, the cycle of heating means operation is shortened, so that heat quantity becomes too large, causing an overshoot.

Then, according to the eighth aspect of the present invention, heat quantity is reduced by shortening the ON time in order to prevent an overshoot when an ON operation is performed within a predetermined time after termination of preset OFF time.

In the fryer according to the ninth aspect of the present invention, the heating means is turned ON/OFF in accordance with second heating control conditions set for each of a plurality of temperature ranges which are different from the normal temperature ranges. For example, when heating is started from the temperature which is much lower than usual such as an initial operation in morning of a day, which means heating is carried out for a long time, heat are accumulated in the heating means and an excess heat raises the oil temperature. In addition, since there are no foods in the oil which are heat absorbing elements the degree of overshoot becomes larger than normal cooking after heating means is turned OFF. Accordingly, heating control which stops the operation of the heating means earlier than normal state is performed.

In the fryer according to the tenth aspect of the present invention, a switching means controls heat quantity by switching the number of heating devices working based on a detected temperature gradient. For example, the number of heating devices working is decreased to prevent overshooting when the temperature gradient is large, while the number of heating devices working is increased in order to raise the oil temperature to a preset temperature rapidly when the temperature gradient is small. Therefore, an accurate oil temperature control is realized.

In the fryer according to the eleventh aspect of the present invention, each of the heating devices works the equalized number of times. As a result, a burden of the heating means is shared.

In the fryer according to the twelfth aspect of the present invention, various set values are stored in a nonvolatile memory which is writable and interchangeable. As a result, the same control software can be applied to many kinds of fryers by rewriting or changing the memory.

BRIEF DESCRIPTION OF THE DRAWINGS

FIG. 1 is a chart showing combustion conditions for each temperature range in a normal operation of a fryer according to the first embodiment.

FIG. 9 is a chart showing combustion conditions for each temperature range in an initial combustion of a fryer of the first embodiment.

FIG. 11 is a chart showing combustion conditions for each temperature range in a normal operation of a fryer of the second embodiment.

FIG. 12 is a chart showing combustion conditions for each temperature range in a normal operation of a fryer of the third embodiment.

FIG. 13 is a chart showing combustion conditions for each temperature range in a normal operation of a fryer of the fourth embodiment.

DETAILED DESCRIPTION OF THE INVENTION

Figure 2:
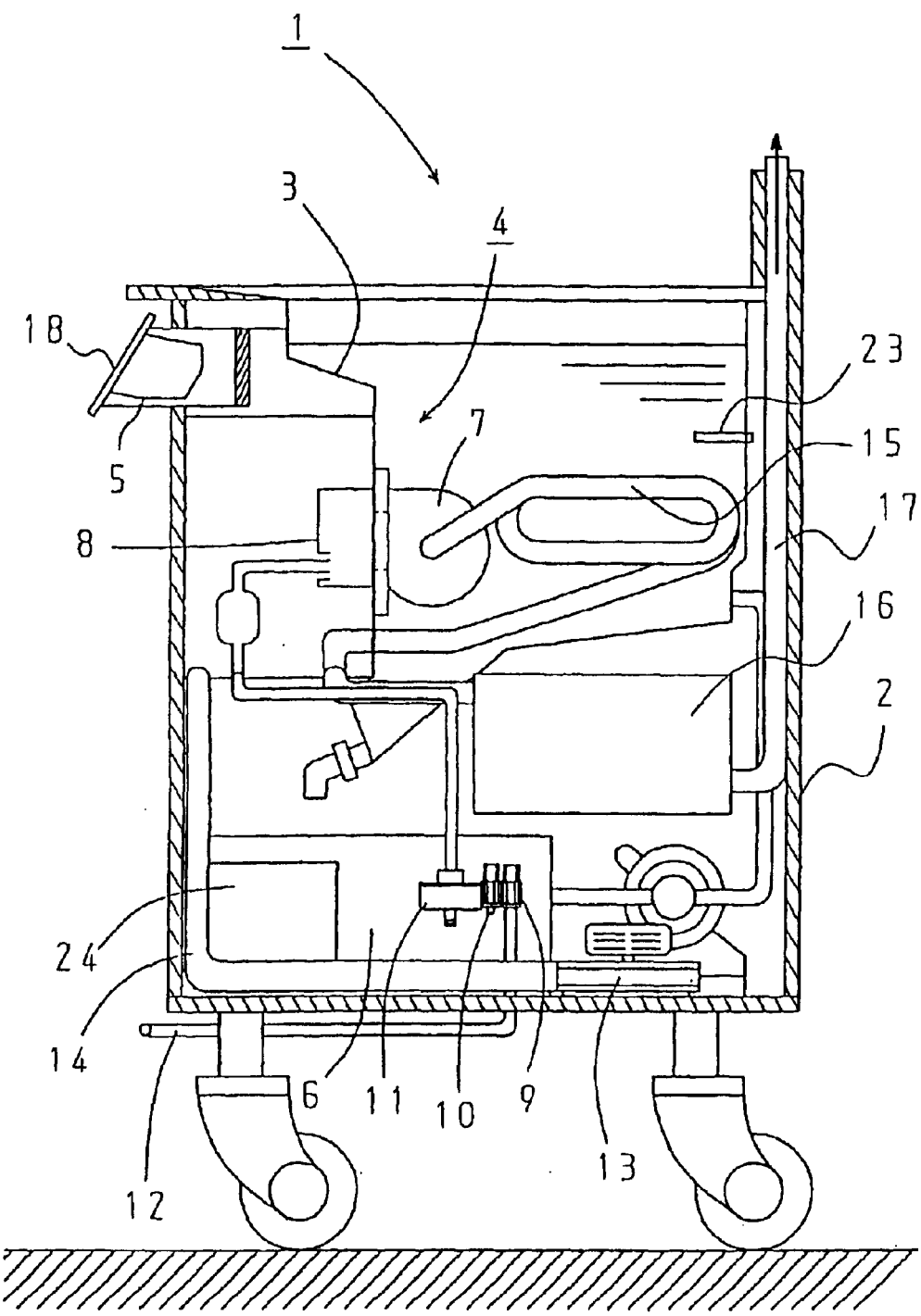
FIG. 2 is a schematic view of a fryer of the first embodiment.

To clarify the configuration and operation of the present invention, the preferred embodiments of the present invention are described below.
First Embodiment FIG. 2 shows a schematic view of a fryer for business use (hereinafter, simply referred to as a fryer), as a first embodiment of the present invention.

The fryer 1 has a casing 2, which includes an oil vessel 3 filled with cooking oil for frying foods (hereinafter, simply referred to as oil), a pulse burner 4 provided within the oil vessel 3 for heating the oil, a temperature sensor 23 for detecting a temperature of the oil, a heating controller 24 for controlling the operation of the pulse burner 4 so that the temperature of the oil is maintained at a set temperature, a cooking controller 5 for notifying an end of cooking timers installed therein according to each cooking menu, and an oil reservoir 6 for temporarily holding the oil to be filtered of the oil vessel 3.

The pulse burner 4 has a combustion chamber 7 located in the oil vessel 3 and a mixing chamber 8 located at the outside of the oil vessel 3 and communicated with the combustion chamber 7. The mixing chamber 8 is connected to a gas conduit 12 for feeding a flow of fuel gas. The gas conduit 12 is provided with, from the upstream side, an intake electromagnetic valve 9, a main electromagnetic valve 10, and a gas governor 11. The mixing chamber 8 is also connected to an air supply conduit 14 with which a blower 13 is provided for supply of fresh combustion air. Further, the combustion chamber 7 is communicated with a tail pipe 15 extending through the oil vessel 3, and the tail pipe 15 is connected to an exhaust pipe 17, that opens to the outside of the fryer 1, via de-coupler 16 at the outside of the oil vessel 3. It should be noted that a solid oil at a room temperature such as shortening is employed as cooking oil.

Figure 3:
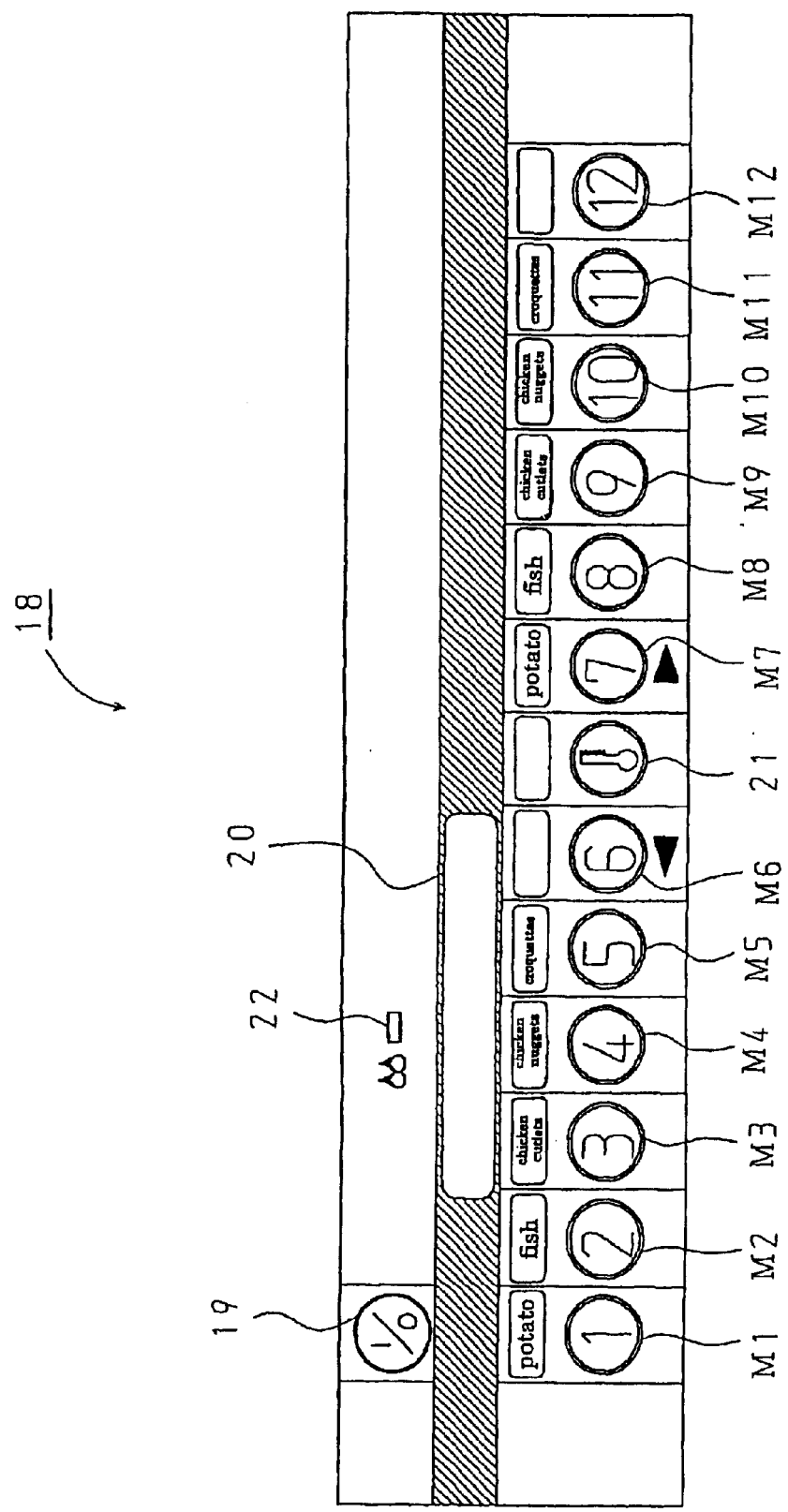
FIG. 3 is a front view of a display panel of the first embodiment.

The primary part of the cooking controller 5 is configured by a microcomputer, and an operating panel 18 is provided at the front of the casing 2. FIG. 3 shows a front view of the operating panel 18, which includes an operation switch 19 for performing ON/OFF operation of the fryer 1, a display portion 20 for displaying cooking menus, the oil temperature and the remaining time of the cooking timers, a changeover switch 21 for alternating displays of the display portion 20, a lamp 22 for emitting a light during an operation of the pulse burner 4, menu switches M1–M12 for starting the cooking timers for the predetermined time according to each cooking menu.

The heating controller 24 has the primary part configured by a microcomputer. It is connected on its input side to the temperature sensor 23 provided in the oil vessel 3 and is connected on its output side to the electromagnetic valves, a fan motor, lamps and buzzers, etc. Further, the heating controller 24 is connected to the cooking controller 5 which includes the operation switch 19. In response to ON control of the operation switch 19, the heating controller 24 performs ON/OFF control of the pulse burner 4 so as to maintain the oil temperature at a setting level (340° F.=approximately 171.1° C.).

Now the heating control (oil temperature control) of the fryer of the present embodiment is described below using a flow chart of FIGS. 4–7. This oil temperature control is carried out by various temperature control methods set in accordance with each of four preset temperature ranges.

Here, an oil temperature control will be described, where the detected temperature is higher than a preset temperature when the fryer 1 starts its operation by the operation switch 19 being turned on. An oil temperature control with detected temperature lower than the preset temperature will be described later.

Figure 4:
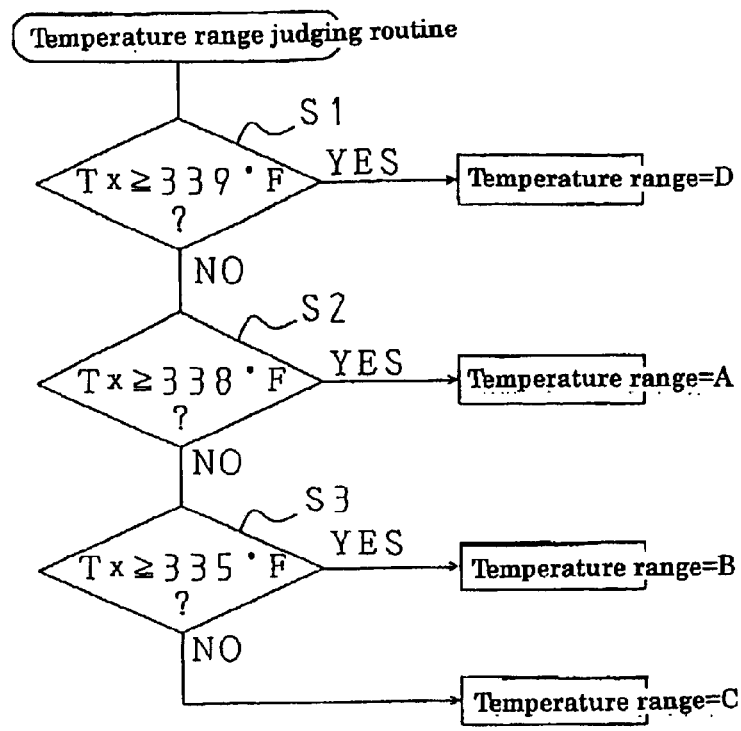
FIG. 4 is a flow chart showing an oil temperature judging routine of the first embodiment.
Figure 5:
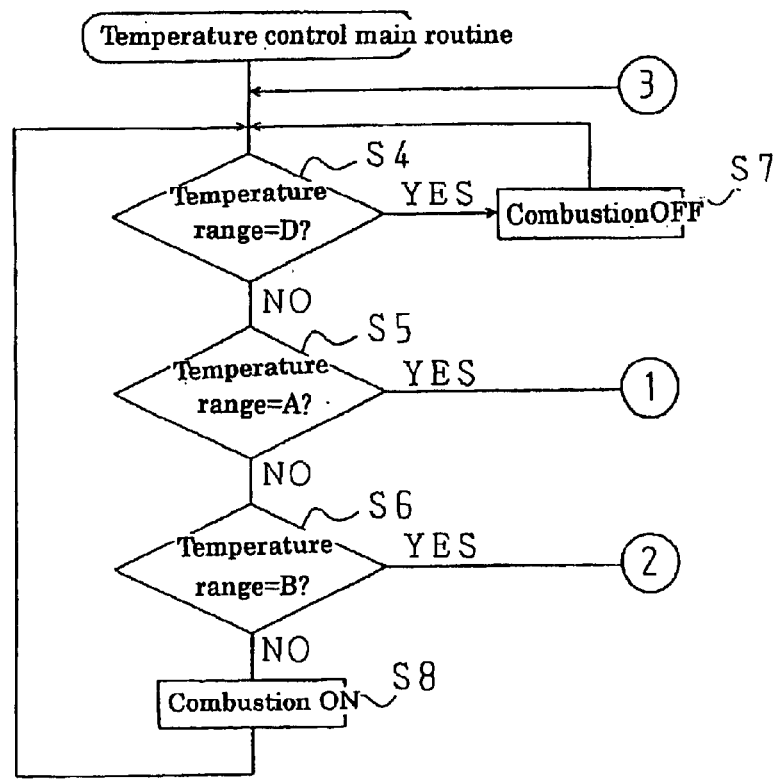
FIG. 5 is a flow chart showing an oil temperature control main routine of a fryer of the first embodiment.
Figure 6:
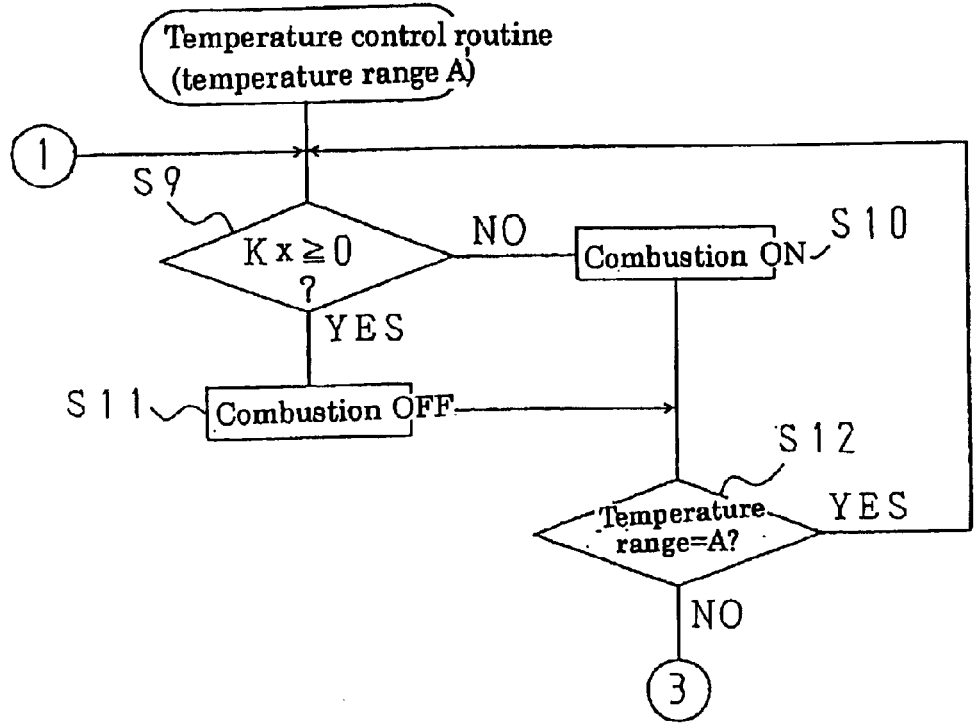
FIG. 6 is a flow chart showing an oil temperature control routine (oil temperature range A) of a fryer of the first embodiment.

When the operation switch 19 is turned ON, the temperature range judging routine (as shown in FIG. 4) and temperature control main routine (as shown in FIG. 5) start. These two routines are always carried out together. In the temperature range judging routine, the temperature detected by the temperature sensor 23 is classified into the following ranges: if it is 339° F. or more, it is classified a temperature range D (S1: YES), if it is 338° F. or more and less than 339° F., it is classified into a temperature range A (S2: YES), if it is 335° F. or more and less than 338° F., it is classified into a temperature range B (S3: YES), if it is less than 335° F., it is classified into a temperature range C (S3: NO).

Now the standards of these four temperature ranges are explained.

In temperature range D, the oil temperature is almost within a set temperature (340° F.).

In temperature range A, the oil temperature is slightly less than the set temperature by natural heat discharge of oil in the oil vessel which has no foods.

In temperature ranges B and C, the oil temperature is lowered because foods are put into the oil vat. The temperature range which is closer to the set temperature is temperature range B, and temperature range C is lower than temperature range B. In these ranges, the heating control methods are different because an overshoot could occur when it is heated rapidly in temperature range B, which is relatively closer to the set temperature.

The temperature control main routine judges the temperature range among temperature ranges A–D to which the temperature range detected by the temperature range judging routine belongs (S4, S5, S6). If it belongs to temperature range A (S5: YES), the temperature control routine for temperature range A starts. If it belongs to the temperature range B (S6: YES), the temperature control routine for temperature range B starts.

If it belongs to temperature range C, that is, the detected temperature is below 335° F. (S6: NO), a pulse burner is always turned ON to heat the oil (S8). If it belongs to temperature range D, that is, the detected temperature is above 339° F. (S4: YES), the pulse burner is always turned OFF (S7).

The temperature control routine for temperature range A calculates the temperature gradient Kx (° F./5s: a temperature change of the oil in 5 seconds) and judges whether Kx is more than 0 (° F./5s) (S9). If Kx is negative, the pulse burner 4 is turned ON (S10). If Kx is positive, the pulse burner 4 is turned OFF (S11).

That is, in temperature range A which is slightly lower than the set temperature, the pulse burner 4 is turned ON when the oil temperature is lowering, whereas the pulse burner 4 is turned OFF when the oil temperature is rising.

Further, by calculating the temperature gradient Kx by measuring a variation of oil temperature for a certain period, such as 5 seconds, frequent switching of the ON/OFF control of the pulse burner 4 by a momentary change of oil temperature (that is, a noise) can be prevented.

In this combustion control, the temperature control routine judges that the oil temperature is within the temperature range A (S12). As long as the oil temperature is within temperature A (S12: YES), this control is repeated until the oil temperature is out of temperature range A (S12: NO). Then it goes back to the temperature control main routine, and it is judged to which temperature range among A–D the oil temperature belongs again.

Figure 7:
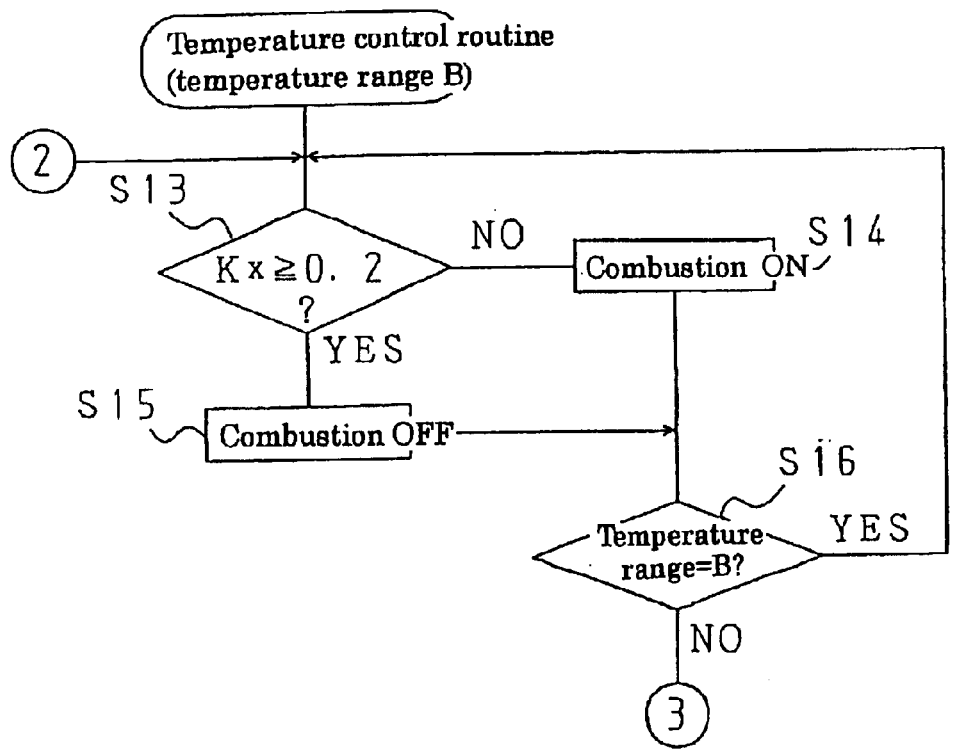
FIG. 7 is a flow chant showing an oil temperature control routine (oil temperature range B) of a fryer of the first embodiment.

As shown in FIG. 7, in the oil temperature control routine for the oil temperature range B, the oil temperature gradient Kx (° F./5s) is calculated to judge whether or not it is over 0.2 (° F./5s) (S13). If Kx is smaller than 0.2, the pulse burner 4 is turned ON (S14), and if Kx is 0.2 or more, the pulse burner 4 is turned OFF (S15).

In other words, when the oil temperature is gradually rising, in temperature range B, which is slightly lower than the temperature range A, the pulse burner 4 continues burning. When the oil temperature rises more rapidly than the preset gradient, the pulse burner stops the combustion.

In this combustion control, the temperature control routine judges that the oil temperature is within temperature range B (S16). As long as the oil temperature is within temperature B (S16: YES), this control is repeated until the oil temperature becomes out of temperature range B (S16: NO). Then it goes back to the temperature control main routine, and it is judged to which temperature range among A–D the oil temperature belongs again.

The combustion conditions for each of the above temperature ranges are described in FIG. 1. By changing the combustion state like this, the combustion can be controlled according to its purpose.

In temperature range A, which is close to the set temperature, the main purpose is oil temperature control when there are no foods in the oil vessel (that is, no load is applied). In this condition, the oil temperature is maintained within the set temperature plus alpha (approximately the set temperature). Moreover, when the oil temperature is lowered right after adding food (Kx<0), combustion is started immediately, whereas when the oil temperature rises after adding food (Kx>0), combustion is always stopped.

In temperature range B, which is lower than temperature range A, the main purpose is oil temperature control when foods are put into the oil vessel. In this range, basically, the purpose is to raise the oil temperature to temperature range A by operating a pulse burner 4. When the oil temperature gradient exceeds a certain value, combustion is stopped, whereby overshoot of the desired oil temperature can be prevented.

In other words, a large oil temperature gradient means that factors in absorbing heat are decreased (that is, foods and utensils are fully heated or foods are taken out from the oil vessel, etc.) Thereby, the heating needs to be stopped earlier than heating with a small oil temperature gradient. Further, when the oil temperature gradient is relatively small, the timing to turn off the pulse burner 4 could be late, whereby heating is not stopped soon enough. As a result, a frequent ON/OFF switchover is prevented.

Moreover, in the oil temperature range C, which is lower than the temperature ranges A and B, the purpose is oil temperature control when a great amount of food is put into the oil vessel. In this range, the pulse burner 4 is always turned ON to raise the oil temperature rapidly.

Thus, due to the above-described temperature control, when no load is applied, it is possible to maintain the oil temperature at a stable level. Further, during cooking, overshoot is prevented when foods are taken out of the oil vessel after cooking because the temperature gradient becomes large and heating is stopped early. Further, when foods are fully heated, overshoot is prevented even if the kind and amount of food is changed because the oil temperature gradient becomes large due to a lack of heat absorption of foods, and the heating can be stopped early.

Moreover, when the oil temperature becomes slightly lower than the oil temperature range D, including the most desirable temperature, that means, the temperature gradient becomes minus, the pulse burner 4 is turned on immediately, which prevents a large drop of oil temperature.

Accordingly, it is possible to cook foods in the most desirable temperature by preventing an overshoot or a drop, whereby cooking performance is improved and tasty cooked foods are obtained. Further, as the oil temperature does not rise excessively, the oil deterioration is reduced and there is no need to replace oil frequently, whereby it is economical. Further, the unnecessary switching ON and OFF of the pulse burner 4 is not frequently performed, and the utensil is deteriorated slowly, whereby its durability is extended.

Further, the control condition of the pulse burner 4 is very simple, that is, whether or not the oil temperature gradient exceeds a standard value. There is no need for a complicated control, whereby the reliability of the temperature control is accurate.

In initial combustion where heating is started from a temperature which is much lower than the normal temperature for cooking, the pulse burner 4 stores much heat by being heated for a long time than usual. As the oil is heated by the extra heat stored in the pulse burner 4, and there are no foods to absorb the heat, the degree of overshoot becomes large after the pulse burner is turned off.

Then, if the oil temperature is lower than the set temperature after the operation switch 19 is turned on, it is judged that heating has been performed for a long time without food. The fryer 1 according to the present invention, when the oil temperature is below the set value when the operation switch 19 is turned on, performs the oil heating control which is different from the above-described control and stops combustion early. Therefore, an overshoot can be prevented.

Figure 8:
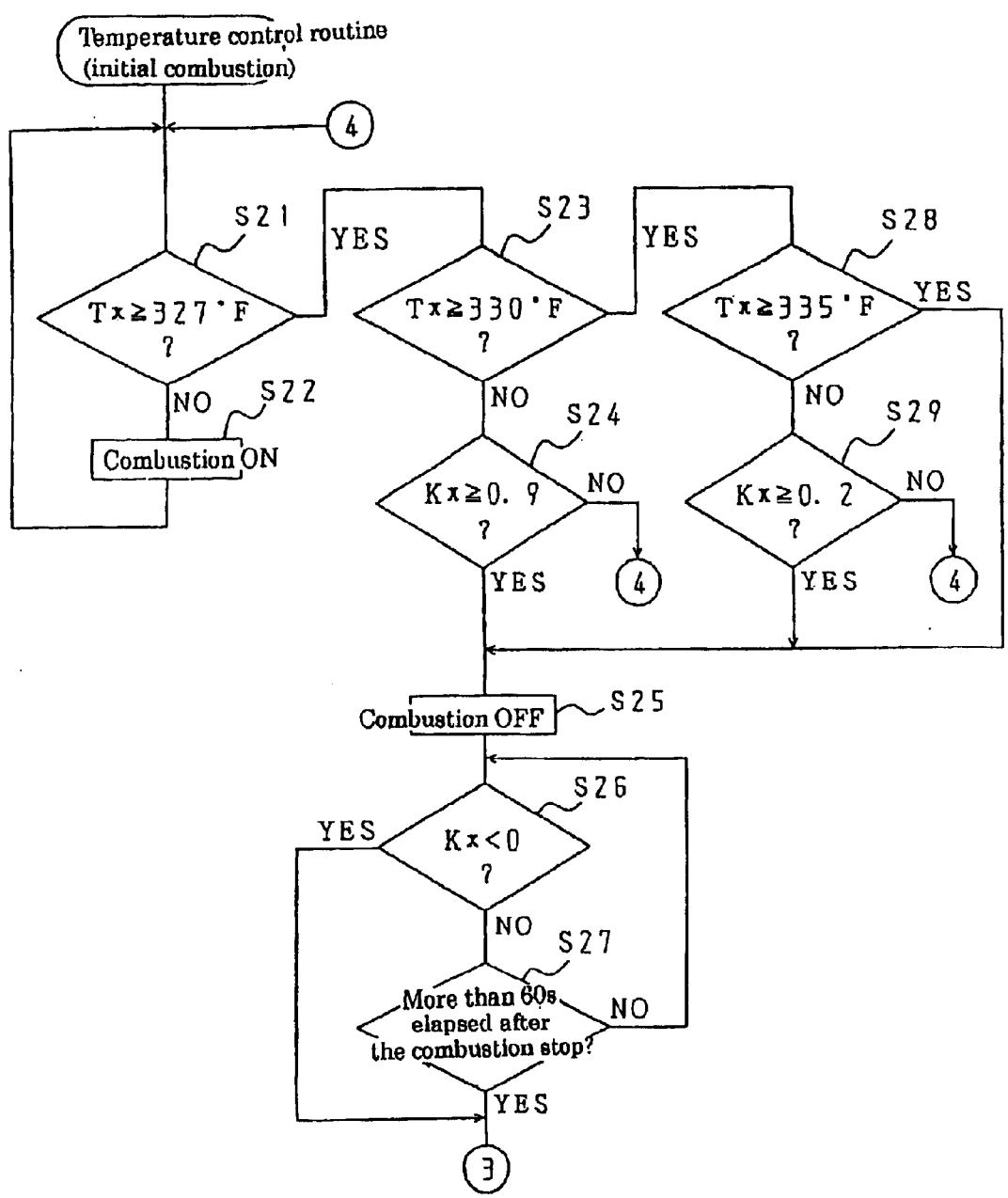
FIG. 8 is a flow chart showing an oil temperature control routine (an initial combustion) of a fryer of the first embodiment.

Next, a combustion control (oil temperature control) will be described wherein the oil temperature is below the predetermined value when the operation switch 19 is turned on using the flowchart of FIG. 8. This oil temperature control is performed using various kinds of oil temperature control methods determined by each oil temperature range, which is different from the above-mentioned temperature range.

When the operation switch 19 is pressed and the oil temperature detected by the temperature sensor 23 is below the set temperature (for example, 320° F.), a temperature control routine for an initial combustion starts.

Until the detected temperature reaches 327° F., the pulse burner is always turned ON (S22), and the oil is heated. When the oil temperature is 327° F. or more and less than 330° F. (S21: YES, S23: NO), the oil temperature gradient Kx (° F./5s) is calculated to judge whether Kx is over 0.9 or not (S24). If Kx is smaller than 0.9, that is, the oil temperature does not rise so rapidly, the pulse burner 24 is continued to operating (S24: NO).

On the other hand, when the oil temperature rises rapidly (S24: YES), the pulse burner 4 is turned off (S25) to prevent an overshoot. Then, when sixty seconds elapsed after the combustion stops (S27: YES), it goes to the oil control main routine. At this process, if the oil temperature gradient becomes minus within sixty seconds (S26: YES), it immediately goes to the oil temperature control main routine.

When the oil temperature is 330° F. or more and less than 335° F. (S23: YES, S28: NO), the oil temperature gradient Kx is calculated to judge whether Kx is over 0.2 or not (S29). If Kx is smaller than 0.2, that is, the oil temperature rises slowly, the pulse burner 4 continues to operate (S29: NO).

On the other hand, when the oil temperature rises rapidly (S29: YES), the pulse burner 4 is turned off (S25) to prevent an overshoot. Then, when sixty seconds elapsed after the combustion stops (S27: YES), it goes to the oil control main routine. At this process, if the oil temperature gradient becomes minus within sixty seconds (S26: YES), it immediately goes to the oil temperature control main routine.

When the oil temperature is over 335° F. (S28: YES), the combustion is automatically stopped (S25), it goes to the oil control main routine (S26: YES or S27: YES).

The combustion conditions for each of the above temperature ranges at an initial combustion are described in FIG. 9.

As described above, by turning off combustion at a temperature that is lower than that of combustion with foods, an overshoot at an initial combustion is prevented. Moreover, the oil temperature gradient varies according to the warmth of the utensil or time length of heating. As the oil temperature gradient becomes larger, the overshoot becomes larger (that is, a heat exchange to things other than the oil is full capacity), the heating is turned off to prevent an overshoot when the oil temperature gradient is large.

Second Embodiment

Figure 10:
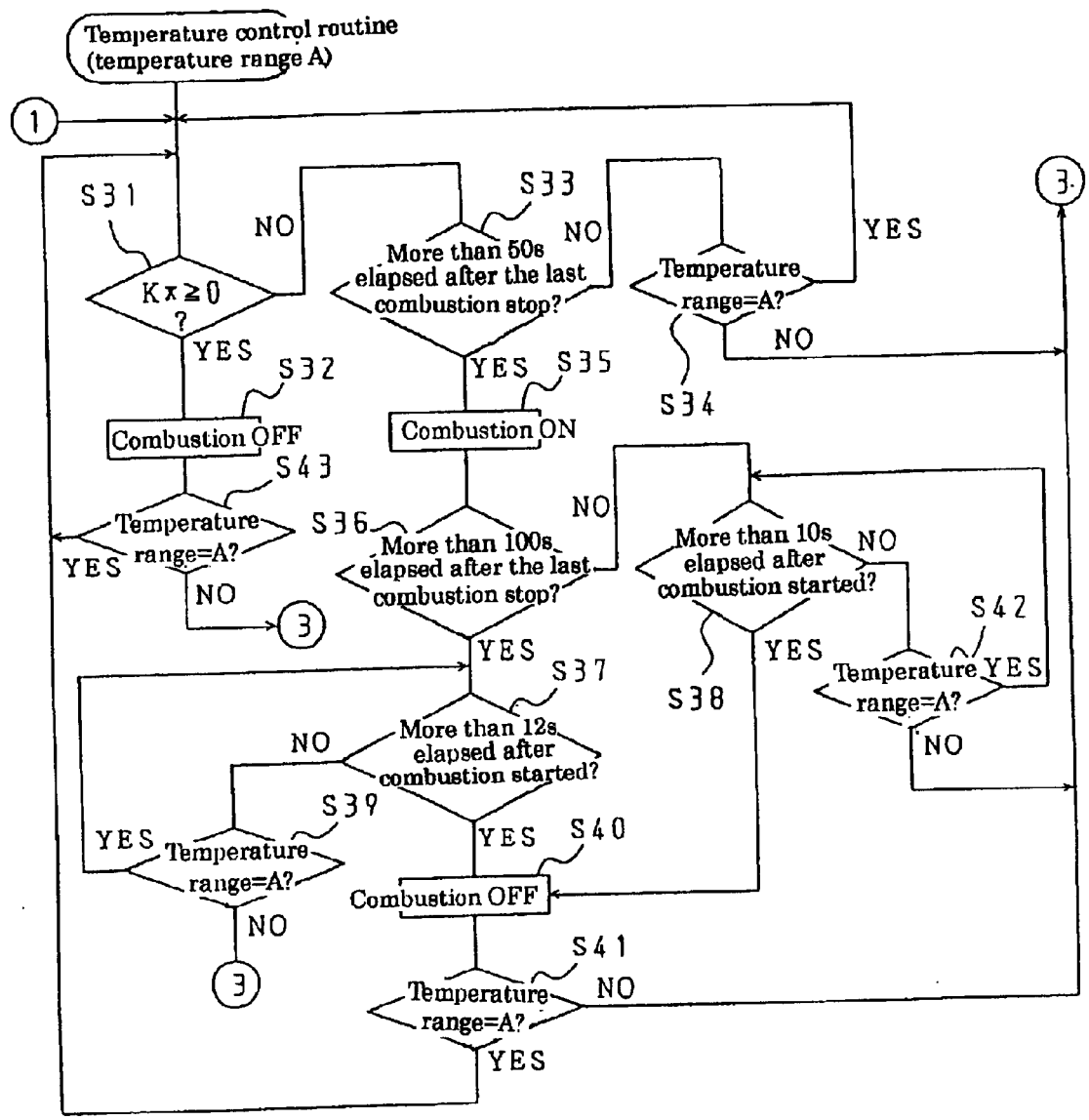
FIG. 10 is a flow chart showing an oil temperature control routine (temperature control A) of a fryer of the second embodiment.

Next, a second embodiment of the present invention is explained using FIGS. 10–11. It should be noted that only the features which are different from the first embodiment will be explained, and features which are the same as those of the first embodiment are denoted with the same reference numbers and will not be explained.

With the oil temperature control condition of the first embodiment, it is difficult to control the oil temperature to an excellent level due to the response delay of the oil temperature change around the temperature sensor 23 with respect to temperature change around a center portion of the oil vessel 3 into which foods are put. For example, when no load is applied, there is no oil circulation by foods and the necessary heat quantity is small. Moreover, oil circulation by combustion seldom occurs because heating is necessary only for a short time and oil convection seldom occurs. Therefore, the speed of heat transmission to the temperature sensor 23 could be slow. In this condition, combustion might not be stopped because the oil temperature around the temperature sensor 23 would not rise enough although the center of the oil vessel 3 into which foods are put is fully heated so that combustion would be stopped, whereby an overshoot could occur.

Then, in the fryer according to a second embodiment, when no load is applied, the heat quantity needed to raise the oil temperature to a setting level is almost fixed because there are no foods as a factor of change and heat quantity of the utensil is fixed. Taking advantage of this, the second embodiment has a condition based on time such that combustion ON and combustion OFF are repeatedly performed at a predetermined interval in addition to the condition of the first embodiment.

The difference between the first embodiment and the second embodiment is the oil temperature control in temperature range A wherein no load is applied. Therefore, the oil temperature control routine for the temperature range A only will be explained below using FIG. 10.

First, the oil temperature gradient Kx is calculated to judge Kx is 0 or more (S31). If Kx is positive, that is, the oil temperature is rising, a pulse burner 4 is turned off to stop the combustion (S32), in order to judge whether the oil temperature is included in a temperature range A (S43). If it is so (S43: YES), it goes to S31. If not (S43: NO), it goes to the oil temperature control main routine.

On the other hand, if Kx is smaller than 0 (S31: NO), that is, the oil temperature is lowering, a pulse burner 4 is turned ON. At this process, the pulse burner has a waiting time for 50 seconds from the previous combustion OFF (S33: NO). If the oil temperature is out of the temperature range A during the waiting time (S34: NO), it goes to the temperature control main routine.

Then, when 50 seconds elapsed after the previous combustion OFF (S33: YES), the pulse burner 4 is turned ON (S35). At this process, it is judged that whether 100 seconds elapsed or not after the previous combustion OFF (S36). If it is so (S36: YES), the combustion is continued for 12 seconds (S37). If not (S36: NO), the combustion is continued for 10 seconds (S38). This is because heat quantity becomes too large with a short interval after the previous combustion. For example, when the temperature gradient Kx is 0 or more for a long time (S31, S32 and S43 are repeated), as 100 seconds already elapsed at S33, the combustion is continued for 12 seconds. On the other hand, when the temperature gradient Kx is 0 or more for a short time (S31, S32, S43 are repeated), it goes to S36 before 100 seconds elapsed, the combustion is continued for 10 seconds.

During the combustion (S37, S38), when the oil temperature is out of temperature range A (S39: NO, S42: NO), it goes to the oil temperature control main routine.

After combusting for 12 or 10 seconds, the combustion is stopped (S40). Then, it is judged whether the oil temperature is included in temperature range A or not (S41). If it is so (S41: YES), it goes to S31 to repeat the above process. If not (S41: NO), it goes to the temperature control main routine.

It should be noted that, in this embodiment, 12 seconds for burning the pulse burner 4 at S37 corresponds to preset ON time of the present invention. 50 seconds for waiting time from the previous combustion OFF at S33 corresponds to preset OFF time of the present invention. 100 seconds as an elapsed time judged at S36 corresponds to a maintaining OFF time after a preset OFF time of the present invention. 10 seconds for burning the pulse burner 4 at S38 corresponds to shortened ON time of the present invention.

The above-described combustion conditions will be explained using a chart of FIG. 11.

When the oil temperature is within temperature range A, which is slightly lower than the set temperature, that is, no load is applied because there are no foods in the vessel, the pulse burner 4 is turned ON for a predetermined time (for example, 12 seconds) and turned OFF automatically. In other words, since the heat quantity needed to raise the oil temperature to a setting level is almost equalized when no load is applied, the combustion is continued for a predetermined time for obtaining the necessary heat quantity. Accordingly, even if there is a gap between the oil temperature around the temperature sensor 23 and that in other parts of the oil vessel 3 due to a shortage of oil communication, an overshoot can be prevented to maintain the oil temperature control in an excellent level.

Moreover, as the pulse burner 4 is controlled to ON and OFF for a certain period of time respectively, frequent switchover is prevented in the temperature range A where there is a subtle oil temperature change, thus the utensil's durability is extended.

When cooking has just finished, oil communication occurs to eliminate gaps of the oil temperature between in various parts of the oil vessel. In this process, regardless of the stability of whole heat quantity, the temperature gradient could be minus. As a result, the operation cycle of the pulse burner 4 is shortened, so that an overshoot could occur because heat quantity becomes large.

In order to solve the above, in the fryer according to the second embodiment, the preset ON time is shortened to decrease the heat quantity, thus overshooting is prevented when elapsed time from the previous combustion stop is short (for example, within 100 seconds) at the start of combustion.

Third Embodiment

Next, the third embodiment of the present invention will be explained using FIG. 12. It should be noted that the features which are different from the first embodiment and the second embodiment will be explained, and the features which are the same as the first embodiment and the second embodiment are denoted with the same reference numbers and will not be explained.

The fryer according to the third embodiment comprises a first pulse burner and a second pulse burner (not shown in the drawings) in the oil vessel. Combustion control by operating one or both of these two burners can perform an accurate oil temperature control based on an ON/OFF control condition of two burners as well as the temperature gradient, which are set in accordance with each temperature range.

The combustion conditions of the fryer according to the third embodiment are described in FIG. 12. These combustion conditions include a switching of the pulse burners' operation as well as the combustion conditions of the first and second embodiments.

In temperature range A, when the temperature gradient Kx is smaller than 0, one pulse burner operates. In other words, in temperature range A which is slightly below the set temperature, half of the heat quantity is needed to prevent an overshoot.

In temperature range B, when the temperature gradient Kx is 0.2 or more, the pulse burners stop combustion. When Kx is more than −0.3 and less than 0.2, one pulse burner operates. When Kx is smaller than −0.3, two pulse burners operate. In other words, when the oil temperature is greatly dropping with putting of foods, full heat quantity is needed to raise the oil temperature to a setting level immediately. On the other hand, when the oil temperature is slightly falling or gradually rising, half of the heat quantity is needed to prevent an overshoot.

It should be noted that after the first pulse burner is operated, the second pulse burner is operated in the next cooking when only one pulse burner is operated. That is, the order is employed such as the first, the second, the first, the second . . . is employed at a combustion of one pulse burner. Accordingly, the number of operation times of each pulse burner becomes the same so that a burden of repeated operation is shared, whereby the utensil's durability can be extended.

Fourth Embodiment

Next, the fryer according to the fourth embodiment will be explained using FIG. 13. It should be noted that the features which are different from the first embodiment, the second embodiment and the third embodiment will be explained, and the features which are the same as the above three embodiments are denoted with the same reference numbers and will not be explained.

The fryer according to the fourth embodiment includes combustion conditions where frequent ON/OFF switching of the pulse burner is prohibited so that the durability of the utensil can be extended.

In temperature ranges A and B, after turning ON the pulse burner 4, combustion continues for at least 10 seconds. Further, when combustion continues until the oil temperature reaches temperature range D, combustion is not stopped immediately, but continues for at least 5 seconds from starting. Therefore, frequent ON/OFF switching of the pulse burner is prohibited, whereby the durability of the utensil is extended.

Moreover, when combustion is turned OFF in temperature range D, switching to ON is prohibited for at least 50 seconds as long as the oil temperature is over temperature range A. By doing this, frequent ON/OFF switching of the pulse burner 4 can be prevented, which is otherwise caused by a subtle oil temperature change between temperature range D and temperature range A due to instability of the temperature detected by the temperature sensor 23.

In the high temperature scope in the temperature range B (337° F. or more), when the temperature gradient Kx is more than 0, the combustion is stopped and continues to stop for more than 50 seconds as long as Kx is more than 0. That is, frequent ON/OFF switching of the pulse burner 4 can be prevented in the high temperature scope in the temperature range B where the oil temperature change is subtle like temperature range A.

According to the above, fryers according to the first, second, third and fourth embodiments are explained. In these fryers, various routines for oil temperature control (control software) are stored in a microcomputer of the heating controller 24. To operate the routine, the necessary parameters are as follows: a classification of the oil temperature into a temperature range; a standard value of the elapsed time; and a temperature gradient for judging the ON/OFF control of the combustion. These are determined by the amount of the oil, the volume of the utensil (that is, heat capacity) and the heat quantity. Then, the parameters are stored in a nonvolatile memory for an external storage such as $E^2PROM$. By doing this, even if there is a wide variation of the utensils, the same control software can be used by changing $E^2PROMs$ or rewriting the parameters stored in $E^2PROM$, thus the cost can be saved.

The above description of embodiments of the present invention has in no way been provided for the purpose of limiting the present invention, and it is of course possible to diversely embody the present invention within the scope not departing from the essential points of the present invention.

According to the above, in a fryer according to the first aspect of the present invention, an ON/OFF control of the heating means is performed based on a heating control condition that is different by each of the plurality of temperature ranges. In other words, the operation of the heating means is controlled in accordance with factors which effect the oil temperature, whereby, an accurate oil temperature control is performed based on various conditions. This enables improved cooking performance while preventing an overshoot, thus foods can be cooked tasty.

In a fryer according to the second aspect of the present invention, the preset temperature ranges include a temperature range where the heating means is switched ON and OFF according to the temperature gradient. Thereby, the oil temperature controlled to an excellent level. Moreover, since the condition to perform ON/OFF control of the heating means is simple, for example, whether or not the temperature gradient of the cooking oil exceeds the standard value, no complicated control is required and reliability is improved.

In a fryer according to the third aspect of the present invention, the heating means is always turned ON when the oil temperature is in a range which is far below the set temperature, whereas the heating means is always turned OFF when the oil temperature is in a range which is the most desirable temperature range or over. Further, when the oil temperature is in a range between the above, the ON/OFF control of the heating means is performed according to the temperature gradient. Therefore, the oil temperature can be controlled to an excellent level. For example, in the last temperature range, the heating means is turned OFF early to prevent an overshoot when the oil temperature gradient is large.

In the fryer according to the fourth aspect of the present invention, the temperature range where the ON/OFF control of the heating means is performed according to the temperature gradient is subdivided into a plurality of temperature ranges. As each of the ranges has a different standard value of the temperature gradient as a criterion to switch ON/OFF the heating means, the timing of combustion can be also set in detail, which enables a more accurate oil temperature control.

In the fryer according to the fifth aspect of the present invention, frequent ON/OFF control of the heating means is prevented, thus the durability of the heating means can be extended.

In the fryer according to the sixth aspect of the present invention, even if there is a gap in the oil temperature between locations around the temperature sensor and in the other locations of the oil vessel, temperature overshooting can be prevented to maintain an excellent level of oil temperature control.

In the fryer according to the seventh aspect of the present invention, an overshoot is surely prevented by means of setting OFF time of the heating means to be longer than ON time in a temperature range which is the closest to the most desirable temperature range including the set temperature.

In the fryer according to the eighth aspect of the present invention, when the operation cycle of the heating means is shortened, for example, when cooking has just finished, heat quantity is decreased to prevent an overshoot.

In the fryer according to the ninth aspect of the present invention, second heating control conditions are set in heating for a long time from a lower oil temperature such as an initial operation in morning of a day. The second heating control conditions are different from the normal state, for example, the heating means is turned OFF earlier than normal state. Therefore, an overshoot can be prevented because the stopping time for the heating means becomes earlier.

In the tenth aspect of the present invention, the fryer has a heat quantity control function by switching of the number of heating devices working among a plurality of heating devices. Therefore, a more accurate oil temperature control can be performed.

In the eleventh aspect of the present invention, the burden of the heating devices is shared so that their durability can be extended.

In the twelfth aspect of the present invention, the same control software can be applied to many kinds of fryers by rewriting or changing nonvolatile memories, thus, the cost can be saved.

What is claimed is:

1. A fryer comprising:
an oil vat for containing cooking oil;
heating means for heating the cooking oil;
heating control means for maintaining the temperature of the cooking oil at a preset temperature;
a temperature sensor for detecting the temperature of the cooking oil,
means for storing a plurality of heating control conditions each corresponding to a different preset temperature range; and
mean for turning said heating means ON and OFF according to one of said heating control conditions corresponding to the temperature range in which the detected temperature is classified to maintain the oil temperature at the preset temperature; and
temperature gradient detecting means for detecting a gradient of the detected temperature with respect to elapsed time;
wherein said preset temperature ranges include a temperature range wherein said heating means is switched ON and OFF according to the temperature gradient.

2. The fryer according to claim 1, wherein the temperature range wherein said heating means is switched ON/OFF is divided into at least two sub-temperature ranges, each of said at least two sub-temperature ranges having a different standard temperature gradient value as a criterion to switch ON and OFF said heating means.

3. The fryer according to claim 2, further comprising means for providing a preset minimum ON time for each said temperature range, such that when said heating control means is ON, the ON state will continue for at least said preset minimum ON time.

4. The fryer according to claim 1, further comprising means for providing a preset minimum ON time for each said temperature range, such that when said heating control means is ON, the ON state will continue for at least said preset minimum ON time.

5. The fryer according to claim 1, wherein said heating means comprises a plurality of individually controlled heating devices, said fryer further comprising means for controlling the ON/OFF operation of each said individually controlled heating device and switching means for switching the number of said plurality of heating devices working based on said detected temperature gradient.

6. The fryer according to claim 5, further comprising equalization control means for controlling the operation of said plurality of heating devices so that each said heating device works an equalized number of times.

7. A fryer comprising:
an oil vat for containing cooking oil;
heating means for heating the cooking oil;
heating control means for maintaining the temperature of the cooking oil at a preset temperature;
a temperature sensor for detecting the temperature of the cooking oil;
means for storing a plurality of heating control conditions each corresponding to a different preset temperature range; and
means for turning said heating means ON and OFF according to one of said heating control conditions corresponding to the temperature range in which the detected temperature is classified to maintain the oil temperature at the preset temperature; and
temperature gradient detecting means for detecting a gradient of the detected temperature with respect to elapsed time;
wherein said preset temperature ranges comprise three ranges including (1) a temperature range wherein said heating means is always turned ON, (2) a temperature range wherein said heating means is switched ON/OFF according to the gradient, and (3) a temperature range wherein said heating means is always turned OFF.

8. The fryer according to claim 7 wherein said temperature range wherein said heating means is switched ON/OFF is divided into at least two sub-temperature ranges, each of said at least two sub-temperature ranges having a different standard temperature gradient value as a criterion to switch ON/OFF said heating means.

9. The fryer according to claim 8, further comprising means for providing a preset minimum ON time for each said temperature range, such that when said heating control means is ON, the ON state will continue for at least said preset minimum ON time.

10. The fryer according to claim 7, further comprising means for providing a preset minimum ON time for each said temperature range, such that when said heating control means is ON, the ON state will continue for at least said preset minimum ON time.

11. A fryer comprising:
an oil vat for containing cooking oil;
heating means for heating the cooking oil;
heating control means for maintaining the temperature of the cooking oil at a preset temperature;
a temperature sensor for detecting the temperature of the cooking oil;
means for storing a plurality of heating control conditions each corresponding to a different preset temperature range; and
means for turning said heating means ON and OFF according to one of said heating control conditions corresponding to the temperature range in which the detected temperature is classified to maintain the oil temperature at the preset temperature; and
means for providing a preset minimum ON time for each said temperature range, such that when said heating control means is ON, the ON state will continue for at least said preset minimum ON time.

12. A fryer comprising:
an oil vat for containing cooking oil;
heating means for heating the cooking oil;
heating control means for maintaining the temperature of the cooking oil at a preset temperature;
a temperature sensor for detecting the temperature of the cooking oil;
means for storing a plurality of heating control conditions each corresponding to a different preset temperature range; and
means for turning said heating means ON and OFF according to one of said heating control conditions corresponding to the temperature range in which the detected temperature is classified to maintain the oil temperature at the preset temperature;
means for maintaining the ON operation of said heating means for a preset ON time in one of said temperature ranges which is closest to a desired cooking temperature range including the present temperature; and
means for maintaining the OFF operation of said heating means for a preset OFF time in one of said temperature which is the closest to the desired cooking temperature range including the preset temperature.

13. The fryer according to claim 12, further comprising means for reducing said ON time when said heating means is turned ON within a preset interval from the termination of said OFF time.

14. The fryer according to claim 12, wherein said preset ON time is shorter than said preset OFF time.

15. The fryer according to claim 14, further comprising means for reducing said ON time when said heating means is turned ON within a preset interval from termination of said OFF time.

16. A fryer comprising:
an oil vat for containing cooking oil;
heating means for heating the cooking oil;
heating control means for maintaining the temperature of the cooking oil at a preset temperature;
a temperature sensor for detecting the temperature of the cooking oil;
means for storing a plurality of heating control conditions each corresponding to a different preset temperature range;
means for turning said heating means ON and OFF according to one of said heating control conditions corresponding to the temperature range in which the detected temperature is classified to maintain the oil temperature at the preset temperature;

means for storing a plurality of second heating control conditions each corresponding to a temperature range that is different from said preset temperature ranges of said first heating control conditions; and means for turning said heating means ON/OFF according to one of said second heating control conditions when the detected temperature is below a predetermined value at the time of initial operation.

17. A fryer comprising:

an oil vat for containing cooking oil;

heating means for heating the cooking oil;

heating control means for maintaining the temperature of the cooking oil at a preset temperature;

a temperature sensor for detecting the temperature of the cooking oil;

means for storing a plurality of heating control conditions, each corresponding to a different preset temperature range, in a nonvolatile memory which is writable and interchangeable; and means for turning said heating means ON and OFF according to one of said heating control conditions corresponding to the temperature range in which the detected temperature is classified to maintain the oil temperature at the preset temperature.

* * * * *